United States Patent [19]
Yamamoto

[11] Patent Number: 5,888,167
[45] Date of Patent: Mar. 30, 1999

[54] TOROIDAL TYPE CONTINUOUSLY VARIABLE TRANSMISSION

[75] Inventor: Takeshi Yamamoto, Yokosuka, Japan

[73] Assignee: Nissan Motor Company, Ltd., Yokohama, Japan

[21] Appl. No.: 866,123

[22] Filed: May 30, 1997

[30] Foreign Application Priority Data

Jun. 4, 1996 [JP] Japan .................................. 8-141738

[51] Int. Cl.⁶ .................................................. F16H 15/38
[52] U.S. Cl. .................................. 476/8; 476/40; 476/41
[58] Field of Search .................................. 476/8, 10, 40, 476/41, 42

[56] References Cited

U.S. PATENT DOCUMENTS 3,810,398  5/1974  Kraus ..................................... 476/41 X
5,007,298  4/1991  Machida ................................... 476/41

FOREIGN PATENT DOCUMENTS 7-243499  9/1995  Japan .

Primary Examiner—Allan D. Herrmann
Attorney, Agent, or Firm—Foley & Lardner

[57] ABSTRACT

A power input flange is fixed to the tip of a power input shaft whose diameter increases in steps from a tip thereof along a main body thereof and which is supported within a casing, and a power output disk is supported upon the outer peripheral surface of the power input shaft. A power input disk is supported upon the outer peripheral surface of the power input shaft between the power input flange and the power output disk, and a power roller is provided which is contacted at a variable inclination with both the power input disk and the power output disk. A member which biases the power input disk in the direction of the power output disk is supported upon the power input flange. And the power input flange is supported via a radial bearing upon the outer peripheral surface of a tubular shaped support portion which projects inwards from the casing. By this, the diameter of the support portion is increased as compared with the case in which the power input shaft is directly supported by the casing. By this structure it is possible to increase the strength of the support portion and make the casing more compact, and also the supply of lubricating oil to the biasing member is facilitated.

6 Claims, 2 Drawing Sheets

TOROIDAL TYPE CONTINUOUSLY VARIABLE TRANSMISSION

FIELD OF THE INVENTION

This invention relates to a support structure for a power input shaft of a toroidal type continuously variable transmission.

BACKGROUND OF THE INVENTION

A toroidal type continuously variable transmission is a continuously variable transmission with which the speed change ratio between the power input shaft and the power output shaft can be continuously varied, and a structure therefor is disclosed, for example, in Tokkai Hei 7-243499 published by the Japanese Patent Office in 1995.

In this transmission, a power input disk and a power output disk are supported by radial bearings on the outer surface of the power input shaft, and a plurality of power rollers are arranged in a toroidally shaped space which is defined between these two disks. The power output disk is fitted loose on the power input shaft so as to be free to rotate relative to the power input shaft, but its axial displacement is limited by a bearing. The power input disk is also fitted loose on the power input shaft, but when the power input shaft rotates, cam rollers exerts axial pressure on the power input shaft towards the power output shaft, by which the power rollers are squeezed between the power input and output disks, and due to this axial pressure the input disk rotates together with the power input shaft.

The power rollers are rotated by the rotation of the power input disk and their rotation is transmitted to the power output disk. The power rollers can be inclined via trunnions to any desired angle in the interior of the toroidal space, and, according to this angle of inclination, the rotational speed ratio between the power output disk and the power input disk can be altered as desired by change of the contact positions of the power rollers with these disks.

In this transmission, various members such as the power input disk, the power output disk, the cam rollers and so on are housed within a casing while in a state of being loaded upon the outer surface of the power input shaft. Further, conventionally, the tip of the power input shaft is supported via a radial bearing in a tubular shaped support portion which is formed in the casing.

Since it is necessary to load the various parts onto the power input shaft, it is necessary for the diameter of this power input shaft to be reduced in steps towards its tip, and thus its tip, which is supported in the aforesaid radial bearing, has the smallest diameter of any portion thereof.

For this reason, in this transmission, in order to ensure adequate support force for the tip portion of the power input shaft in the radial direction, it is necessary to make the length in the axial direction of this bearing large, and it is inevitable that this will cause increase in the size of the transmission.

Further, since the support strength of this relatively small diameter tubular shaped support portion tends to be low, it can easily be deformed by loads which act upon the power input shaft. However, if this tubular shaped support portion is even a little deformed, the power input shaft may become tilted with respect to the power input disk or to the power output disk, and this is a primary factor leading to the generation of vibration and noise.

Since the power input shaft supplies lubricating oil to the cam rollers which generate a high thrust force, it is formed to be hollow. However, even if this hollow portion has an opening at the tip of the power input shaft, since the tip portion of the power input shaft is inserted into the inside of the tubular shaped support portion, the opening is undesirably blocked by the tubular shaped support portion, and it is difficult to provide an oil conduit from this opening to arrive at the cam faces of the cam rollers.

For this reason, the structure of the supply conduit for the lubricating oil to the cam rollers inevitably becomes complicated.

SUMMARY OF THE INVENTION

It is therefore an object of this invention to shorten the total length of the power input shaft of a toroidal type continuously variable transmission.

It is a further object of this invention to Increase the support strength of the power input shaft of a toroidal type continuously variable transmission.

It is a still further object of this invention to facilitate the supply of lubricating oil to the cam rollers in a toroidal type continuously variable transmission.

In order to achieve the above objects, this invention provides a toroidal type continuously variable transmission, comprising a casing, a power input shaft supported in the casing, this power input shaft having a diameter increasing in steps from a tip thereof along a main body thereof, a power input flange fixed to the tip of the power input shaft, a power output disk supported upon the outer peripheral surface of the power input shaft, a power input disk supported upon the outer peripheral surface the power input shaft between the power input flange and the power output disk, a power roller contacted at a variable inclination with both the power input disk and the power output disk, a mechanism for biasing the power input disk in the direction of the power output disk, the biasing mechanism being supported upon the power input flange, a tubular shaped support portion which projects inwards from the casing,and a radial bearing which supports the power input flange upon the outer peripheral surface of the tubular shaped support portion.

It is preferable that the power input flange is fixed onto the tip of the power input shaft by a nut.

It is further preferable that the power input flange is engaged to the power input shaft by a spline.

It is also preferable that the nut is housed inside the tubular shaped support portion.

It is also preferable that the power input shaft further being pierced with an axially extending lubricating oil conduit which opens at the tip of the power input shaft and the power input flange further being formed with a hole which communicates the lubricating oil conduit to the vicinity of the biasing mechanism.

It is also preferable that the biasing mechanism comprises a cam roller which rotates and biases the power input disk towards the power output disk as the power input disk rotates relative to the power input flange.

The details as well as other features and advantages of this invention are set forth in the remainder of the specification and are shown in the accompanying drawings.

DESCRIPTION OF THE PREFERRED EMBODIMENTS

Figure 1:
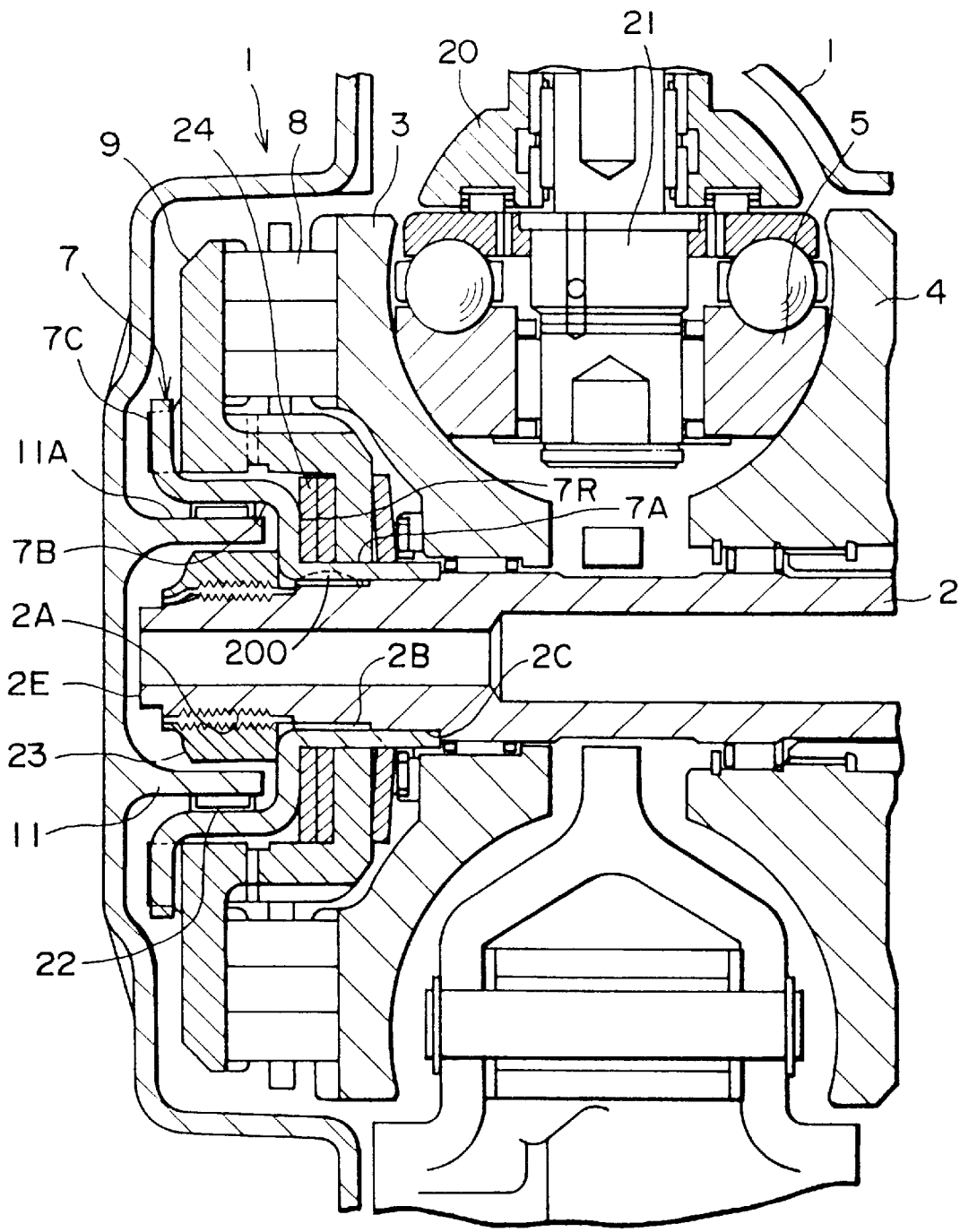
FIG. 1 is a vertical sectional view of essential parts of a toroidal type continuously variable transmission according to a first embodiment of this invention.

Referring to FIG. 1 of the drawings, the toroidal type continuously variable transmission according comprises a power input shaft 2, upon the outside surface of which a power input disk 3 and a power output disk 4 are supported by respective radial bearings.

A toroidally shaped space is defined between the -mutually confronting faces of these disks, and a plurality of power rollers 5 are disposed within this toroidal space.

The power input disk 3 is engaged via cam rollers 8 to a cam flange 9 which rotates together with the power input shaft 2. This cam flange 9 is supported by the power input shaft 2 via a power input flange 7.

The power input flange 7 has a two step cylindrical surface which is made up from a first tubular portion 7A and a second tubular portion 7B. The smaller diameter first tubular portion 7A is pressed over the outer surface of a press fitting portion 2C which is formed midway along the power input shaft 2. A portion of this first tubular portion 7A is engaged with a splined portion 2B (spline shown in phantom at 200) of the power input shaft 2 formed adjacent to the press fitting portion 2C.

The first portion 7A and the second tubular portion 7B are connected together via a first flange portion 7R. A loading nut 23 which is screwed onto a screw portion 2A formed between the splined portion 2B and the tip 2E of the power input shaft 2, fixes the power input flange 7 on the power input shaft 2 and prevents it from displacing in the axial direction.

Further, a second flange portion 7C is formed at the extremity of the second tubular portion 7B.

The cam flange 9 is fitted onto the outer surface of the first tubular portion 7A. Further, it is engaged with the second flange portion 7C so as to prevent the power input flange 7 from displacement in the axial direction, and it also is supported in the axial direction by the first flange portion 7R via a washer 24.

The cam rollers 8 are rotated by relative rotation between the power input disk 3 and the cam flange 9, and thereby move the power input disk 3 towards the power output disk 4, in other words press it to the right as seen in the figure.

On the other hand, the power output disk 4 is connected to a power output gear not shown in the figure which is positioned to the right of the figure, and its position in the axial direction is fixed by an angular bearing not shown in the figure which supports this power output gear.

As a result, when the power input shaft 2 rotates, the power rollers 5 are squeezed between the power input disk 3 and the power output disk 4 with a pressure which is based upon the pressing force of the cam rollers 8. The power input disk 3 rotates together with the power input shaft 2 due to this pressing force, and transmits rotation to the power rollers 5. Each of the power rollers 5 is supported upon an eccentric shaft 21 so as to be free to rotate thereupon, and its inclination can be changed according to the position of a trunnion 20. And the rotation of the power input disk 3 is transmitted to the power output disk 4 at a speed change ratio which is determined by this inclination. The rotation of the power output disk 4 is transmitted to a power output shaft via the power output gear and another gear meshed therewith.

The diameter of the power input shaft 2 increases from its tip 2E at its left end in the figure through, in order, its screw portion 2A, its splined portion 2B, and its press fitting portion 2C. The tip 2E only slightly protrudes from the end of the screw portion 2A in the direction of the casing 1. Accordingly, as compared to the prior art described above, the total length of the power input shaft 2 is shortened, and it becomes possible to shorten the overall length of the transmission in the axial direction.

The interior of the casing 1 of this transmission is provided with a tubular shaped support portion 11 which surrounds the outside of the loading nut 23. A radial bearing 22 is interposed between the outer cylindrical surface of this tubular shaped support portion 11 and the inner cylindrical surface of the second tubular portion 7B of the power input flange 7. This radial bearing 22 may for example be a needle roller bearing or the like.

Further, the tubular shaped support portion 11 is positioned on the outside of the loading nut 23, and its inner diameter is considerably larger than that of the tubular shaped support portion in the prior art as discussed above. Accordingly, it has much greater support strength.

The power input flange 7, as well as being pressed onto the power input shaft 2, is also further fixed thereto by splined engagement and by the loading nut 23. Accordingly, the support of the power input shaft 2 in the radial direction is considerably improved in comparison to the prior art as discussed above. This provides the very beneficial effect of suppressing noise and vibration due to tilting of the power input shaft 2.

Figure 2:
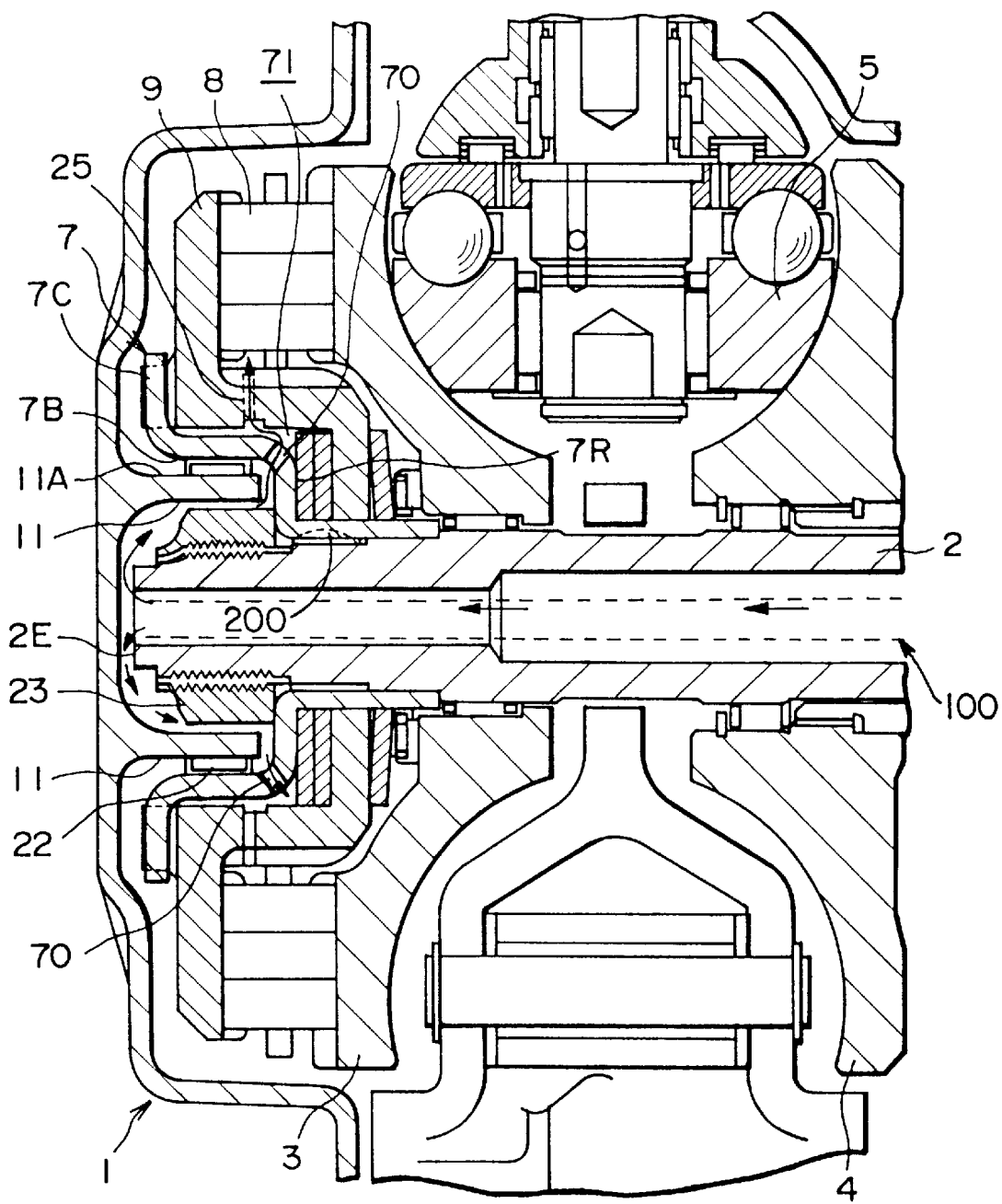
FIG. 2 is similar to FIG. 1, but showing another embodiment of this invention.

FIG. 2 shows another embodiment of this invention.

In this embodiment, a lubricating oil conduit is formed in the power input flange 7 for supplying lubricating oil to the cam rollers 8.

For this, a hole 70 is formed in the bent portion between the first flange portion 7R and the second tubular portion 7B of the power input flange 7. This hole 70 is communicated to a gap 71 which is defined between the power input flange 7 and the cam flange 9.

Further, a lubricating oil conduit 25 which reaches the cam rollers 8 from the gap 71 is formed in the cam flange 9.

Lubricating oil is supplied under pressure from a pump not shown in the figures to the hollow interior, which comprises an axially extending lubricating oil conduit (shown in phantom) schematically referenced at 100, of the power input shaft 2. The conduit 100 opens at tip 2E such that lubricating oil flows from the opening at the tip 2E of the power input shaft 2 into the interior of the tubular shaped support portion 11, and arrives at the hole 70 through the gap between the outside of the loading nut 23 and the tubular shaped support portion 11. And this lubricating oil is then further conducted to the cam rollers 8 via the gap 71 and the lubricating oil conduit 25, so that it lubricates the contact surfaces between the cam rollers 8 and the power input disk 3, and the contact surfaces between the cam rollers 8 and the cam flange 9.

Since the lubricating oil is supplied from near the rotational axes of the power input shaft 2 and the cam rollers 8 which rotate together therewith, the flow of this lubricating oil is greatly promoted by the centrifugal force which accompanies the rotation of the power input flange 7 and the cam flange 9. Accordingly, it is possible reliably to lubricate the contact surfaces between the cam rollers 8 and the cam flange 9 and the power input disk 3, between which a great pressure force is generated.

The embodiments of this invention in which an exclusive property or privilege is claimed are defined as follows:

1. A toroidal type continuously variable transmission, comprising:

a casing;

a power input shaft supported in said casing, said power input shaft having a diameter increasing in steps from a tip thereof along a main body thereof;

a power input flange fixed to said power input shaft;

a power output disk supported upon the outer peripheral surface of said power input shaft;

a power input disk supported upon the outer peripheral surface of said power input shaft between said power input flange and said power output disk;

a power roller contacted at a variable inclination with both said power input disk and said power output disk;

means for biasing said power input disk in the direction of said power output disk, said biasing means being supported upon said power input flange;

a tubular shaped support portion which projects inwards from said casing; and a radial bearing which supports said power input flange upon the outer peripheral surface of said tubular shaped support portion.

2. A toroidal type continuously variable transmission as defined in claim 1, where said power input flange is fixed onto said tip of said power input shaft by a nut.

3. A toroidal type continuously variable transmission as defined in claim 2, wherein said power input shaft engages said power input flange with a spline.

4. A toroidal type continuously variable transmission as defined in claim 2, wherein said nut is housed inside said tubular shaped support portion.

5. A toroidal type continuously variable transmission as defined in claim 1, said power input shaft further being pierced with an axially extending lubricating oil conduit which opens at said tip of said power input shaft and said power input flange further being formed with a hole which communicates said lubricating oil conduit to the vicinity of said biasing means.

6. A toroidal type continuously variable transmission as defined in claim 1, wherein said biasing means comprises a cam roller which rotates and biases said power input disk towards said power output disk as said power input disk rotates relative to said power input flange.

* * * * *